Jan. 24, 1967     F. E. BUSCHBOM     3,299,855
BUNK FEEDER CONVEYOR ASSEMBLY
Original Filed June 8, 1962     8 Sheets-Sheet 5
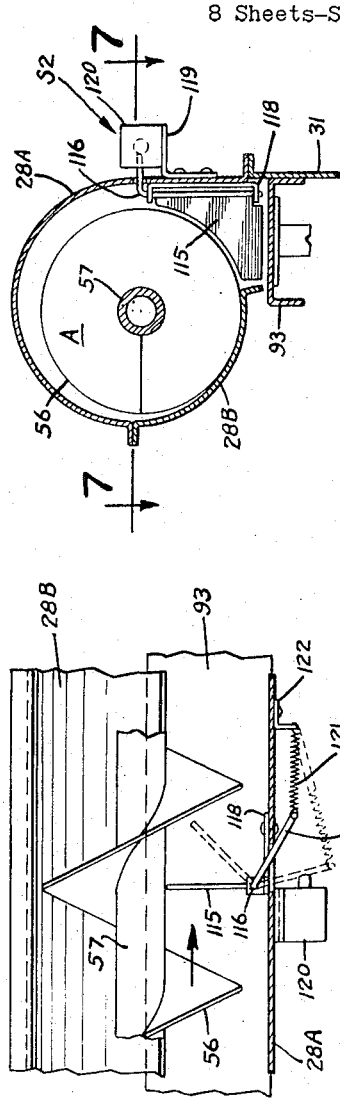
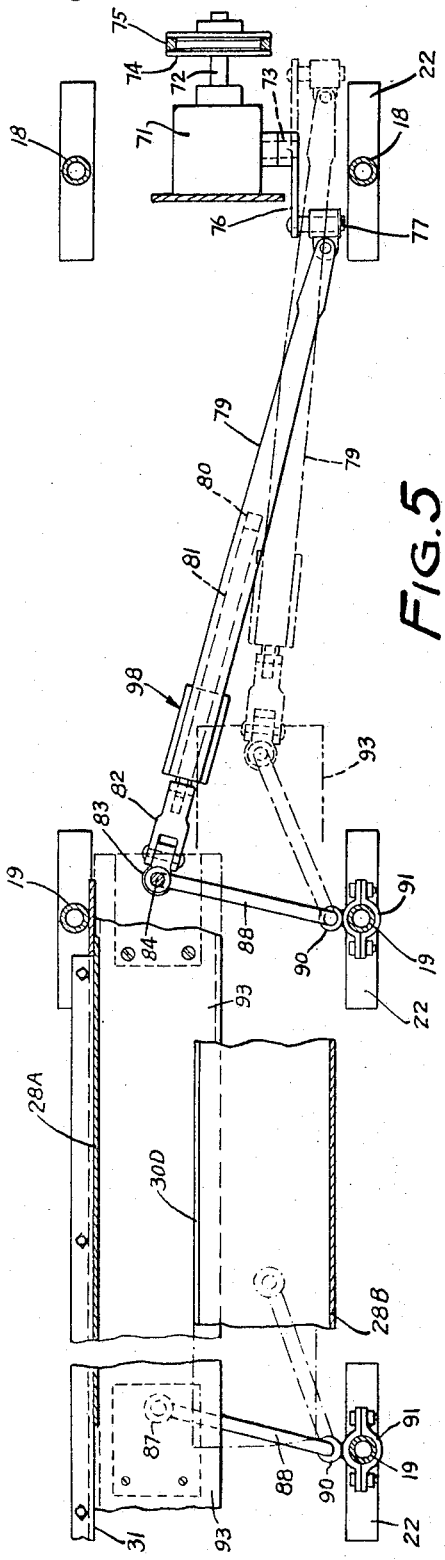
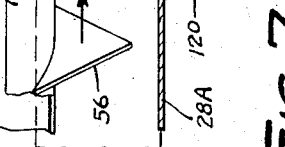
INVENTOR.
FLOYD E. BUSCHBOM
BY
Braddock+Burd
ATTORNEYS Jan. 24, 1967  F. E. BUSCHBOM  3,299,855
BUNK FEEDER CONVEYOR ASSEMBLY
Original Filed June 8, 1962  8 Sheets-Sheet 6

INVENTOR.
FLOYD E. BUSCHBOM
BY
Braddock+Burd
ATTORNEYS

Jan. 24, 1967   F. E. BUSCHBOM   3,299,855
BUNK FEEDER CONVEYOR ASSEMBLY
Original Filed June 8, 1962   8 Sheets-Sheet 7

INVENTOR.
*Floyd E. Buschbom*
BY
*Braddock + Burd*
ATTORNEYS

United States Patent Office 3,299,855
Patented Jan. 24, 1967

3,299,855
BUNK FEEDER CONVEYOR ASSEMBLY
Floyd E. Buschbom, Long Lake, Minn., assignor to Vandale Corporation, Long Lake, Minn., a corporation of Minnesota
Original application June 8, 1962, Ser. No. 201,052, now Patent No. 3,254,798, dated June 7, 1966. Divided and this application Oct. 22, 1965, Ser. No. 500,923
7 Claims. (Cl. 119—56)

This application is a division of Serial No. 201,052, filed June 8, 1962, now Patent No. 3,254,798.

This invention relates to new and useful improvements in control means for dump type bunk feeders.

Briefly described, the invention relates to a control system for a dump type bunk feeder having an elongated housing cooperating with a conveyor means operable to carry feed to the remote end section of the housing. The housing has an elongated bottom opening and means operable to open and close the opening whereby feed may be dumped from the housing. The remote end of the housing has a switch operable to activate the means for dumping feed from the housing. The switch has an actuator member moved to on and off positions by substantially flat movable means mounted on the housing. A flat area of the movable means is engageable with feed moved into the remote end of the housing by the conveyor means. The flat movable means in response to movement of and pressure of feed in the remote end of the housing is operable to actuate the switch thereby activating the means for dumping feed to a position where the feed located in the housing is discharged to a feeding location.

This invention will be described with reference to the drawings in which corresponding numerals refer to the same parts and in which:

FIGURE 5 is a fragmentary plan view with certain parts omitted showing the closure means drive connection and operation;

FIGURE 6 is a view taken along the line and in the direction of the arrows 6—6 of FIGURE 1;

FIGURE 7 is a sectional view taken along the line and in the direction of the arrows 7—7 of FIGURE 6;

FIGURE 8 is a sectional view taken along the line and in the direction of the arrows 8—8 of FIGURE 1;

Figure 1:
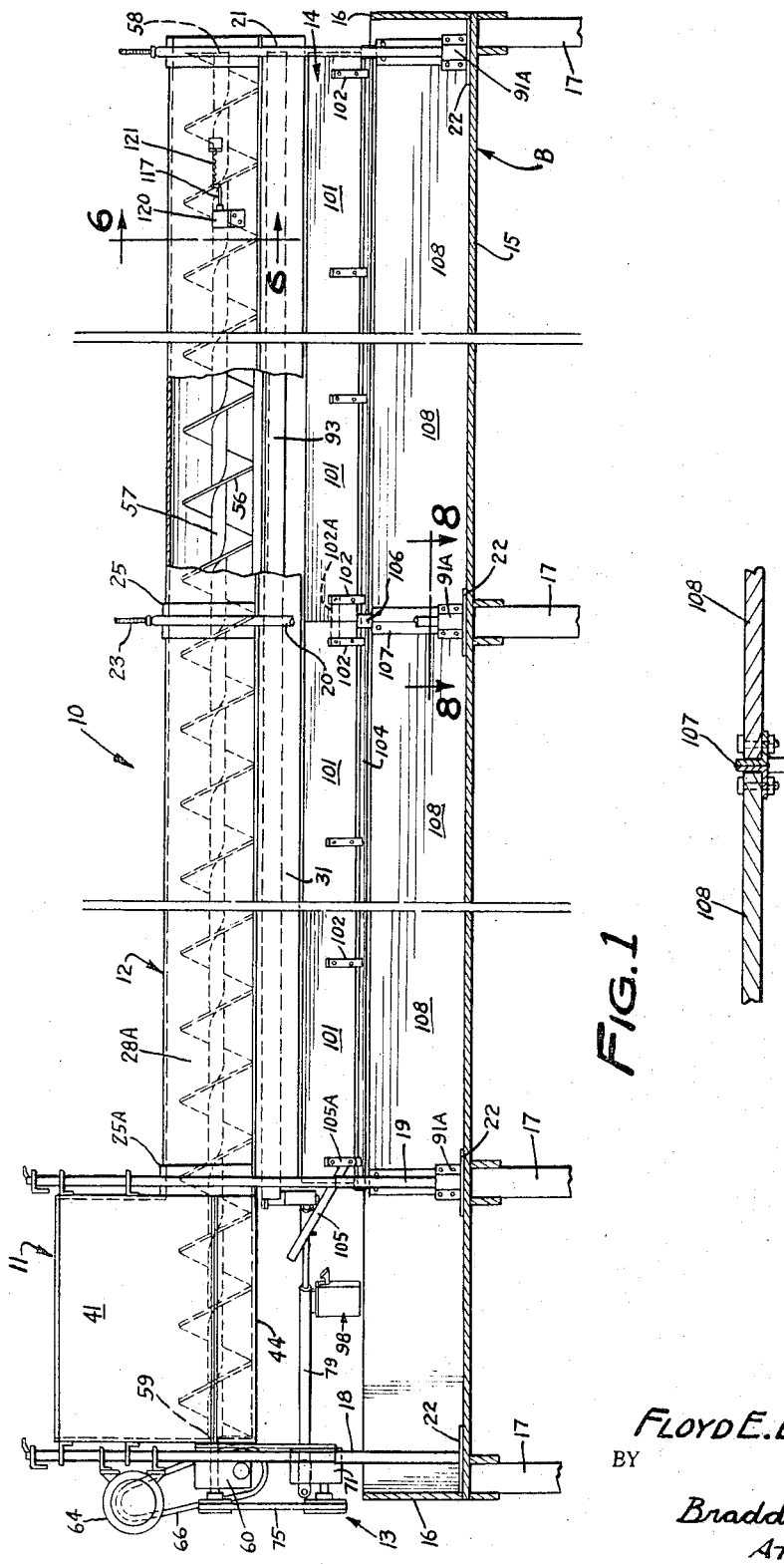
FIGURE 1 is a side elevational view, partly broken away, of the invention installed in a feed bunk, the feed bunk having the closer side rail removed and being shown in fragmentary form.

Reference is now made to the drawings and specifically to FIGURE 1. There is shown the bunk feeder or the like of this invention generally designated 10, including the following generally designated components: the hopper assembly 11, the conveyor assembly 12, the drive assembly 13 and the tiltboard assembly 14. All of these are positioned in the bunk B which is supported by a plurality of legs 17 secured to and supporting a floor or base 15 having a peripheral wall 16, the nearest portion of which is removed for illustration. The bunk B is usually made of wood, although it may be constructed partially or completely of concrete, steel or the like, as desired. The entire feeder 10 is supported on a plurality of support stands 18–21, each of which provides a pair of legs having flat foot plates or flanges 22 which are bolted or otherwise secured to and which rest on and are supported by the floor 15 of the bunk.

Figure 2:
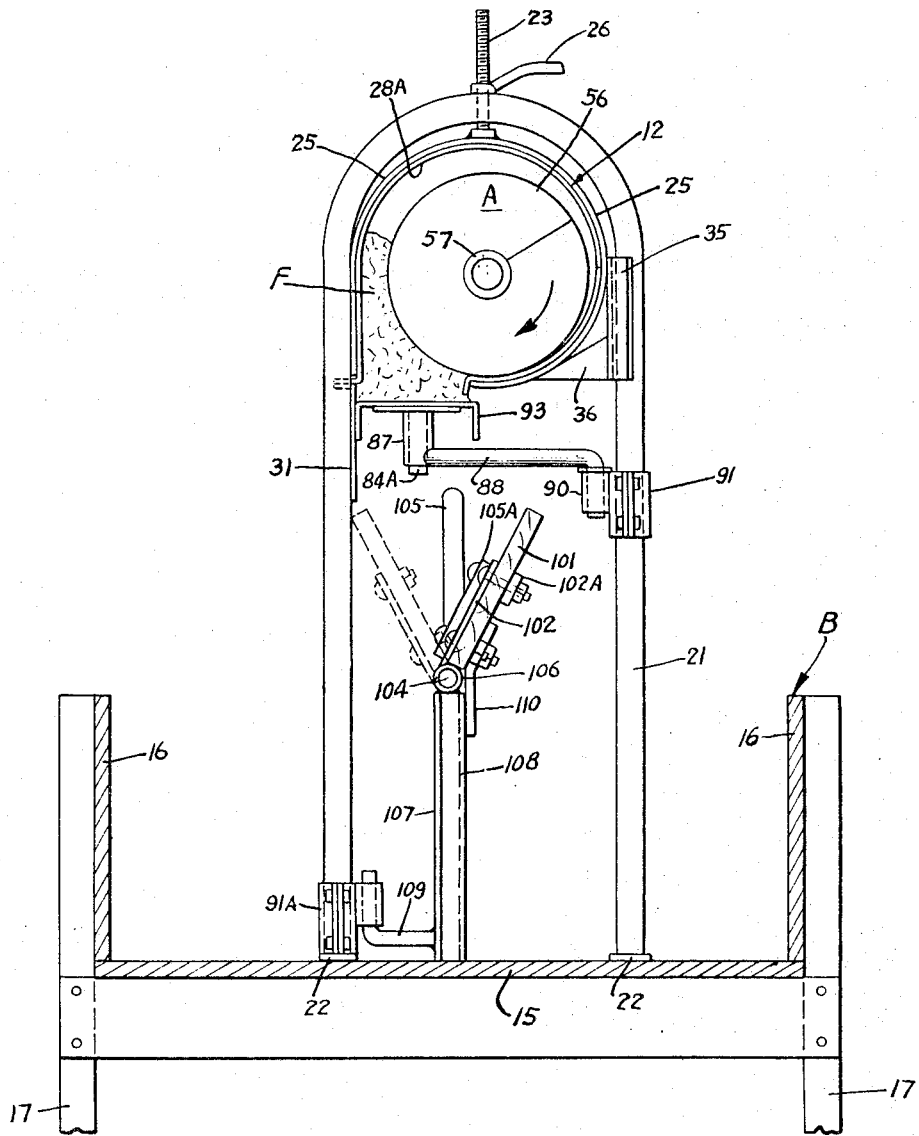
FIGURE 2 is an enlarged right end elevational view with the hopper drive structure and pressure switch removed.

Each of the stands 20–21 is identical, comprising a pair of spaced parallel tubular legs interposed by a semi-circular portion integral therewith as shown in FIGURE 2. They are thus of inverted U-configuration and formed from a tubular or pipe member, as shown. Each is apertured at the bend in the U to receive a threaded bolt or adjusting rod 23 having its head welded or otherwise secured to a hanger bracket and carry over plate 25 of the form shown in FIGURE 3. A handle 26 has an apertured end providing a nut which is threaded onto member 23, all as will be seen by reference to FIGURES 2 and 3. By turning the handle 26 the rod 23 may be raised or lowered with respect to the U portion of member 20 and thus the entire tube assembly 12 is elevated or lowered by turning all of the handles substantially uniformly.

Figure 3:
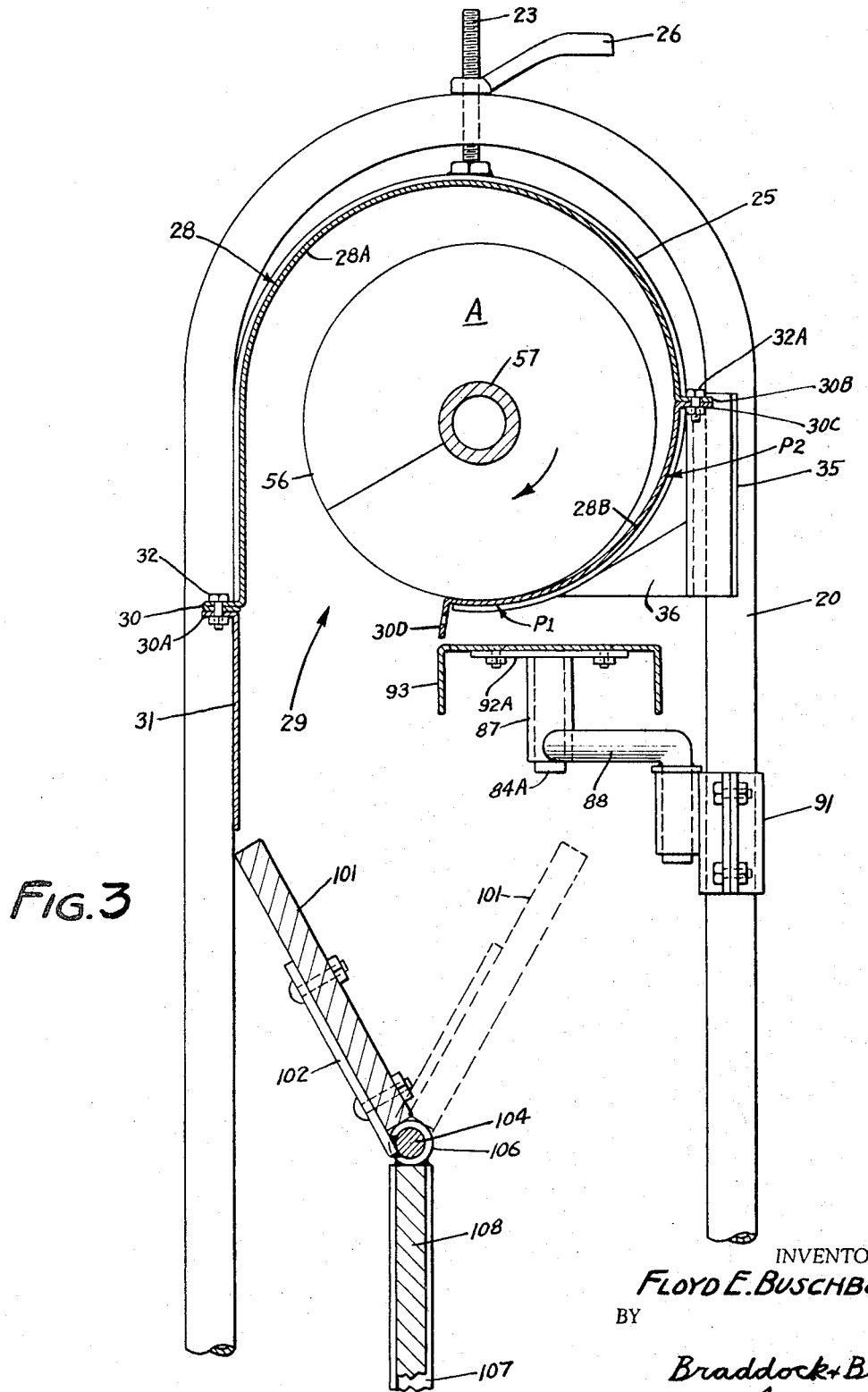
FIGURE 3 is an enlarged fragmentary vertical sectional view of the feeder of this invention showing the feeder in position for dropping feed.

The conveyor assembly 12 includes an elongated housing shroud or hood 28 which is formed of three parts, upper cover 28A, a reversible bottom wall or wear plate 28B, and curtain wall plate or member 31. Members 28A and 28B and 31 are formed of suitable gauge sheet metal and when assembled form an inverted J in cross-section with an elongated aperture or slot at 29. Member 28A is hemmed as shown in FIGURE 3 at 30 to provide an outwardly turned flange, to which is secured the outwardly turned flange 30A of curtain wall plate or member 31. The other edge of member 28A is bent to provide an outwardly turned flange 30B to which is secured one outwardly turned flange 30C of member 28B. Member 28B comprises an elongated member having a cross-section in the form of an arc of a circle with two outwardly turned parallel flanges 30C and 30D at the edges of the arc being uniform so that if there is wear due to the abrasive action of the auger A thereagainst at the portion indicated by P1, the member 28B may be turned end-for-end or reversed whereupon portion P2 would then be positioned under auger A for support. While flange 30 is shown as hemmed to provide a double fold, the flanges at 30A–30D are shown as single fold, although they may be hemmed to provide additional strength, if desired. Each of the outwardly turned flanges 30B–30D and 30–30A is provided with a plurality of aligned apertures so that curtain plate 31 may be bolted to member 28A by a plurality of bolt assemblies 32 and hood cover 28A may be bolted to wear plate 28B by a plurality of bolt assemblies 32A. Apertures in flanges 30C and 30D correspond to the apertures in flange 30B so that when the wear plate 28B is reversed the other flange (in this instance 30D) may be bolted to flange 30B.

Each of the flanges 30–30D have portions removed adjacent the ends thereof to accommodate the plate 25 which overlaps the butted juncture of adjacent sections of hood 28 of the tube assembly 12 as shown in FIGURE 1 and is bolted or otherwise suitably secured thereto at each side of the butt.

Thus, the entire bunk feeder assembly is comprised of a hopper and drive assembly and added on conveyor sections, each including hood, auger and closure, and tiltboard and diverter board sections, if desired, as will become more apparent as further described. While only one conveyor section may be used, additional sections of uniform or varying length are usually used to provide the desired extension.

In this fashion the conveyor assembly tube or hood 28 comprises a plurality of sections, each section formed of the three members 28A, 28B and 31, all bolted together and each section being abutted at at least one end to an adjoining section, or to the hopper assembly 11, and positioned in abutment by the overlapping reinforcing plate 25 bolted thereto. Plate 25 has welded to it throughout the portion designed to support the wear plate 28B, a guide member 35 in a form of a section of angle which is adapted to abut against and ride up and down the adjacent leg of stand 21. A gusset 36 serves to support in position the bottom end of member 25 and is welded to member 35 as shown in FIGURES 2 and 3.

Figure 4:
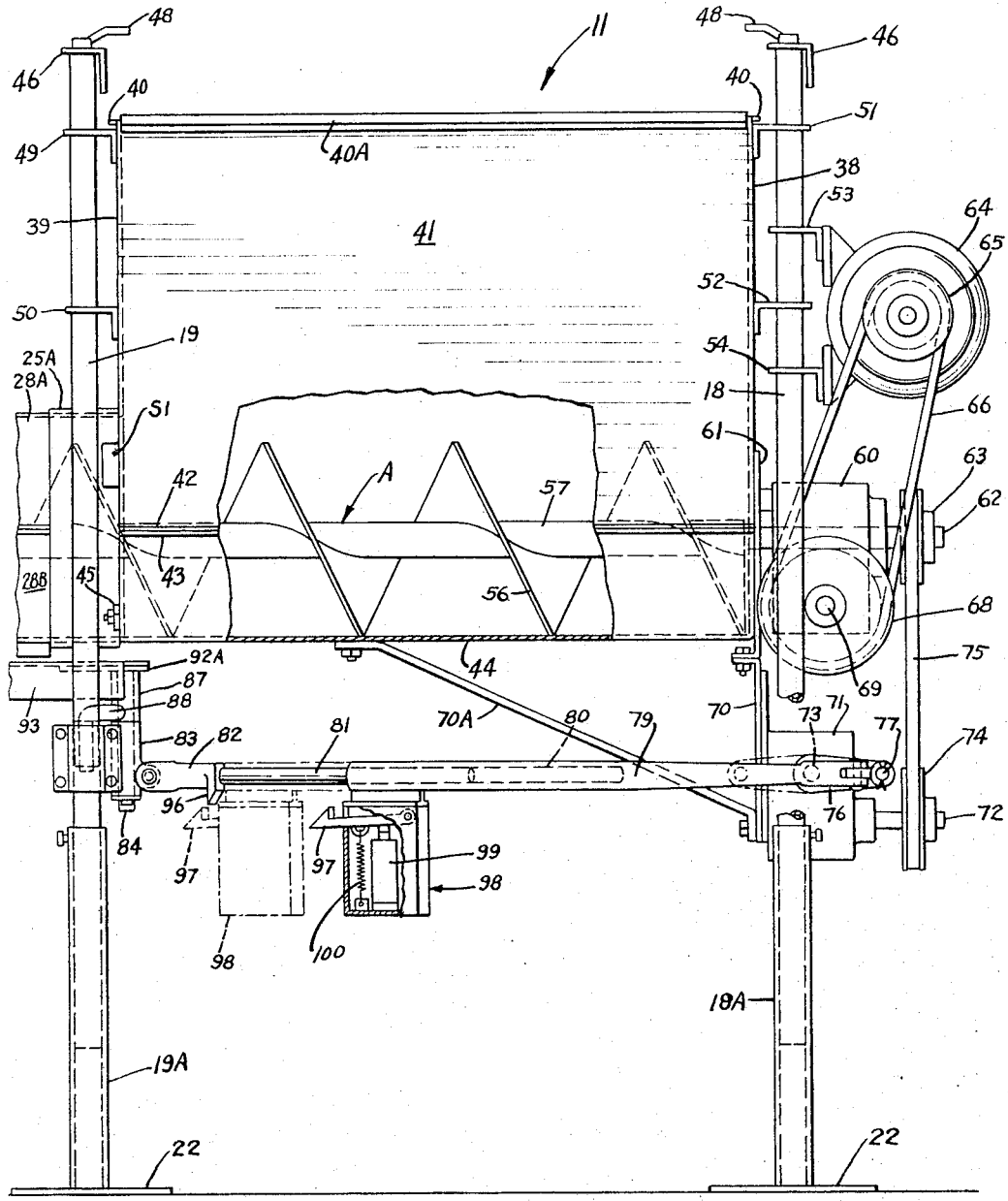
FIGURE 4 is a fragmentary elevational view, partly broken away, showing the actuation means for the auger and closure.

The hopper generally designated 11 has a sheet metal front plate 38, a sheet metal back plate 39, each of generally inverted triangular configuration and having an outwardly flanged top edge 40 and a semi-circular portion cut out at the downwardly turned apex of the triangle. Side panels 41 are joined thereto by being bolted along inwardly turned flanged edges and are provided with similarly outwardly turned top flanges or edges 40A and outwardly turned bottom flanges 42. Outwardly turned bottom flanges 42 cooperate with the outwardly turned flanges 43 of hopper bottom member 44 and are bolted thereto so that bottom member 44, a semicircular closure trough member, forms a bottom for the hopper 11. Member 44 extends beyond end 39 of the hopper 11 and terminates in the middle of plate 25A, as shown in FIGURE 4, abutting up against the bottom of the first wear plate 28B to form a continuation thereof. Thus, it will be apparent that the auger A is supported in its entirety by a plurality of wear plates 28B and by cooperating trough 44 engaging a plurality of arcuate radial portions of the auger at spaced positions. Member 25A is similar to member 25 except that it is provided with a plurality of ears 45 which are bolted to plate 39 to fix it firmly to the hopper 11.

Hopper 11 is supported on stands 18 and 19 which are similar to stands 20 and 21 except that in lieu of having rounded tops they are provided with transverse cross angles 46 which are welded or otherwise secured to the top ends of the vertical tubular legs. Plate 39 of hopper 11 has bolted or otherwise secured thereto a pair of angles 49 and 50. A threaded rod 47A penetrates angle 49 and angle 46 of stand 18 and is secured for adjustment of the hopper upwardly and downwardly. It is welded or secured at one end to handle 48, passes through an aperture in angle 49 and through a nut secured to the underside thereof. Handle 48 engages the top surface of angle 46, as shown.

Angles 49 and 50 are appropriately apertured so that the vertical legs of stand 18 may pass through them, so that angles 49 and 50 may slide vertically on these legs. Additional vertical adjustment of stands 18 and 19 and thus of hopper 11 is provided by telescoping sleeves 18A and 19A in which the legs of hangers 18 and 19 fit and which are secured thereto by set screws so that the legs of hangers 18 and 19 may be adjusted upwardly or downwardly in the telescoping members 18A and 19A and then locked in position. In this instance foot plates or flanges 22 are secured to the bottom ends of sleeves 18A and 19A whereas they are secured to the bottoms of the tubular legs for stands 20 and 21.

Wall 38 is provided with a pair of angle members 51 and 52, in similar fashion to angles 49 and 50 for wall 39. Another threaded rod 47A is welded at one end to handle 48 which engages the top surface of angle member 46 of hanger 19. Angle 51 is appropriately apertured for the penetration of rod 47A and rod 47A penetrates a nut secured to the underside thereof in the same fashion as described for hanger 18 and wall 39.

Angles 51 and 52 are appropriately apertured for the penetration of the vertical legs of hanger 19. Another pair of angles 53 and 54 are apertured and positioned on the legs of hanger 19 and serve as a motor base. Angles 53 and 54 are each turned in the opposite direction from angles 50 and 51 to provide an outwardly turned flat surface having an elongated slot in which the base of the motor 64 is bolted.

As will be apparent, the angles 53 and 54 are appropriately apertured for the passage of the legs of hanger 19 and adjustable upwardly and downwardly vertically thereon. Angles 53 and 54 are maintained in spaced relation by being fixedly secured to the motor. Angle 53 has a pair of threaded rods 55 each welded or otherwise secured at one end thereto and penetrating appropriate apertures in angle 51. It is immobilized in vertical adjustment with respect to angle 51 by pairs of nuts positioned one each above and below the flange of angle 51.

Thus, the motor 64 is suitably positioned to maintain belt tension of belt 66 by vertical adjustment of rods 55 with respect to angle 51, permitted by the sliding of angles 53 and 54 on the legs of stand 19. Once adjusted the motor will then move upwardly or downwardly with the hopper assembly 11 as it is vertically adjusted by handles 48 and rods 47A in unison with handles 26 and rods 23 for the conveyor assembly 12. Additional vertical adjustment of the hopper assembly 11 is provided by sleeves 18A and 19A as described.

The material conveying unit, auger or helical flight means A supported by the wear plates 28B and hopper bottom 44, comprises a plurality of auger sections each comprising a helical flight 56 secured to a tubular center shaft 57. Adjacent sections are abutted together and joined in any suitable manner such as by having adjoining ends of shaft 57 sleeved over a common stub shaft or rod and pinned thereto, or otherwise. Auger A is provided with a distal terminal end 58 and a proximal terminal end 59, as shown in FIGURE 1. End 59 has one end of output shaft 62 of a gear box or transmission 60 positioned therein and pinned or otherwise secured thereto so that the auger A is rotated by the gear box or transmission 60.

Box 60, as perhaps shown best in FIGURE 4, is bolted or otherwise fixed upon a flat plate 61 which is bolted or otherwise attached to wall 38 and serves as a closure for the semicircular cut-out portion in plate 38 and for the respective open end of member 44. Box 60 has the shaft 62 extending from both ends thereof, one end being secured to the hollow shaft 57 of auger A as previously described and the other end being provided with sheave 63. Motor 64 has a shaft which drives sheave 65 and through a belt 66 drives sheave 68 which is secured to and in turn drives the input shaft 69 of gear box 60. Thus, running of the motor 64 drives the input shaft 69 and, through an appropriate worm and worm gear in transmission 60, the output shaft 62 for the rotation of the auger A, and, through sheave 63, of other apparatus presently described.

It will be appreciated that up to this point there has been described a bunk feeder of new and unique construction and function which will operate quite satisfactorily to deliver feed to animals. However, the apparatus subsequently to be described is in the nature of attachments forming an improved combination with additional and meritorious functional features.

Plate 61 has an inwardly turned bottom flange which is bolted to the corresponding inwardly turned top flange on a plate 70 which supports a second gear box or transmission 71, which is bolted thereto in vertical slots. Plate 70 is braced to member 44 by brace 70A, bolted or otherwise secured. Transmission 71 has an input shaft 72 and an output shaft 73, driven through an appropriate worm and worm gear. Shaft 72 is driven by the sheave 74 from belt 75, and in turn driven by sheave 63 as previously explained.

To shaft 73 is secured a crank 76 for rotation therewith. Crank 76 has a pin 77 on which is sleeved a sleeve member 78, retained in position by a washer and cotter key for pivotal movement thereon, and having an apertured tongue which receives a pin or bolt assembly secureing the bifurcated end of pitman arm 79 for pivotal movement thereto as shown in FIGURE 5. Pitman arm 79 is tubular or provided with a central recess at 80 which has an inside diameter slightly larger than the outside diameter of a rod 81 which is slip fit therein for reciprocation as shown in FIGURE 5. Rod 81 has secured to its extending end a bifurcated member 82 secured for pivotal movement by a pin or bolt assembly to the tongue of sleeve 83 positioned for pivotal movement on shaft 84 and retained thereon by a washer and cotter key assembly 85. A second sleeve 87 secured to an arm 88 (FIGURES 4 and 5) is also positioned on shaft 84 and has a downturned end 89 supported for arcuate movement by sleeve 90 of bracket assembly 91. Bracket assembly 91 is made into hemimorphic portions and adapted to be positioned around one of the legs of stand 18, and bolted thereto. End 89 may have a washer secured thereto or an enlarged portion resting on the top face of sleeve 90 as desired.

Shaft 84 is secured to a plate member 92, in turn bolted or secured to the underside of a gate or closure member 93. Closure member 93 is an elongated rectangular plate member having downwardly turned edges which may be hemmed for additional strength as desired. Plate member 92 is bolted thereto and flush with one end, as shown in FIGURE 3. A plurality of members 93 are usually provided, one for each section of hood and auger since a plurality of hood and auger sections is usually used, as previously described. Closure members 93 are then positioned end-to-end and in abutment and supported by plates 92A being positioned to underlay each of the abutting ends. Since there is no abutment for the first and last members 93, plate 92 at the hopper end, and plate 92A at the distal end (of the closure means formed by the plurality of members 93 in end-to-end relation) are each placed flush with the edge of their respective members 93.

Plates 92A are each provided with a shorter shaft 84A as shown for plate 92A in FIGURE 3, than plate 92 since the shaft 84A does not need to penetrate sleeve 83 as does shaft 84 of plate 92 when it is connected to the pitman. Both plates 92 and 92A are supported by arms 88 and brackets 91.

As will be seen in FIGURE 4, member 82 has provided integral with it a depending inclined lug means 96 adapted to be engaged by a tongue 97 of the configuration shown in FIGURE 4. Tongue 97 protrudes from a solenoid assembly 98 supported on the underside of arm 79. Solenoid assembly 98 is provided with a conventional solenoid coil 99 for urging member 97 upwardly against the bias of a spring 100, all as shown in FIGURE 4.

A toggle switch S1 is positioned on wall 39 and is connected to solenoid 99 for continuous actuation thereof, if desired, as later explained.

The tiltboard assembly is perhaps best illustrated in FIGURES 1, 2, 3 and 8. It comprises a plurality of tiltboard sections 101 each bolted to a bracket strap 102, usually two straps being used for each board. Adjacent straps at abutting ends of boards 101 are joined by straps 102A so that all boards tilt in unison. Straps 102 are each welded at one end to tubular rod 104. Board 101 adjacent end 69 is provided with a handle 105, as shown in FIGURE 1, and either on opposite male or female end. Handle 105 has a tubular portion joined at one end to a flat piece 105A, at an angle, piece 105A being bolted to the first bracket strap 102. Rods 104 are straight and each has a short protruding shaft welded in one end to make one male and one female end for positioning in cooperating prolongation and are received in a plurality of sleeves 106 each supported at the top of a divider board bracket 107 which also serves to support adjacent ends of the divider boards 108 which are positioned in abutment and prolongation as shown in FIGURES 1 and 8. Rods 104 are so chosen that when in the assembled position of FIGURE 1, abutting ends are received within sleeves 106. Bracket 107 is bolted to the ends of boards 108. Bracket 107 comprises a T member secured at its bottom end to a rod or pipe 109 which has an upturned end received in the sleeve of a securing bracket assembly 91A. Assembly 91A for bracket 107 is bolted to clamp on one of the tubular legs of stands 19–21, and adjacent foot 22, but otherwise similarly to bracket 91 for arms 88.

Boards 101 are limited in movement in one direction by engagement with the legs of stands 20 and 21 as shown in dotted lines in FIGURE 3, and in the other direction by bent clip 110, bolted to one of straps 102 and having a portion bent to engage board 108, as shown in full lines in FIGURE 3. Usually one member 110 is provided for each board 101.

The pressure switch assembly S2 is best shown in FIGURES 6 and 7. There is shown an actuator 115 of the configuration shown in FIGURE 7, positioned within the hood cover 28A, and secured to a rod 116 having a bent end 117 extending through an elongated aperture in cover 28A. Actuator 115 is a flat upright plate spaced from auger A having an area less than the cross-sectional area of the housing formed by cover 28A and wear plate 28B. Rod 116 is supported in a U bracket 118 bolted or otherwise secured to the inside wall of cover 28A. Positioned on the outside wall by bracket 119 is a microswitch 120 whose actuator is adapted to be engaged by the bent end 117 of rod 116 as shown in FIGURE 7. A spring 121 is connected to a bracket 122 also bolted to cover 28A to retain the pressure switch actuator 115 in the full line position of FIGURE 7 in a plane generally transverse to the axis of auger A. In this position actuator 115 is substantially perpendicular to the longitudinal axis of the housing.

In use actuator 115 intercepts feed moved in said housing by auger A. The force of the feed on actuator 115 pivots the actuator about the axis of rod 116 moving the actuator rearwardly to the broken line position shown in FIGURE 7. With the actuator in this position end 117 engages the actuator of switch 120 holding the switch in the on position. When switch 120 is in the on position, solenoid 99 is energized thereby drivably coupling the clutch members used to swing the dump gate or closure member 93 to the open position. As soon as the feed has moved from the housing, spring 121 biases actuator 115 to its transverse position and moves end 117 away from switch 120. This returns switch 120 to its off position whereby gate 93 is moved to its closed position under the slot 29.

Figure 9:
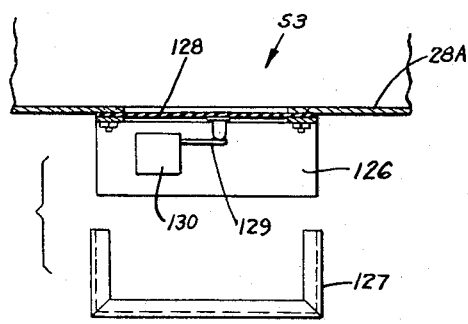
FIGURE 9 is a plan view of a modified form of pressure switch with the cover separated.
Figure 10:
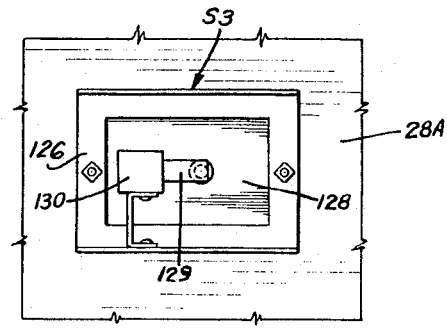
FIGURE 10 is an end view of a portion thereof.

An alternate form of pressure switch S3 is shown in FIGURES 9 and 10. There the pressure switch S3 is shown as bolted to cover a rectangular opening in cover 28A. It is provided with a first U shaped member designated 126 providing a bottom and extending sides and a second U shaped cooperating cover 127 having inwardly turned flanges formed to overlap the parallel side portions of member 126 and bolted or otherwise secured thereto to provide a complete housing for switch S3. The bottom of member 126 is provided with a rectangular aperture which is covered by a cemented or otherwise secured thin membrane 128 of rubber, plastic, etc., which is engaged by the actuator 129 of a microswitch 130 secured to member 126. Membrane 128 may be viewed as a flat movable means mounted on the housing and moved by feed carried to the remote end of the housing by auger A. Member 126 serves as a support for switch 130 and a peripheral frame for holding membrane 128 over the opening in cover 28A. Member 127 merely serves to enclose the entire apparatus. Either of switches S2 and S3 may be positioned adjacent the remote end 58 of the feeder as shown for switch 120 in FIGURE 1. As placed, they are positioned sufficiently far inward from end 58 of the feeder so as to control the opening of gate 93 before any appreciable amount of feed is conveyed from the end 58 by auger A.

Figure 13:
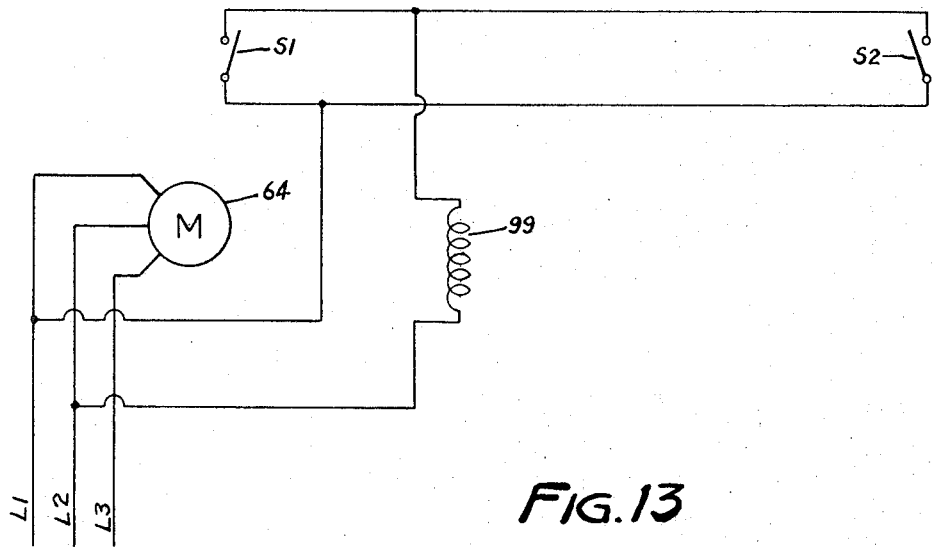
FIGURE 13 is a schematic wiring diagram.
Figure 11:
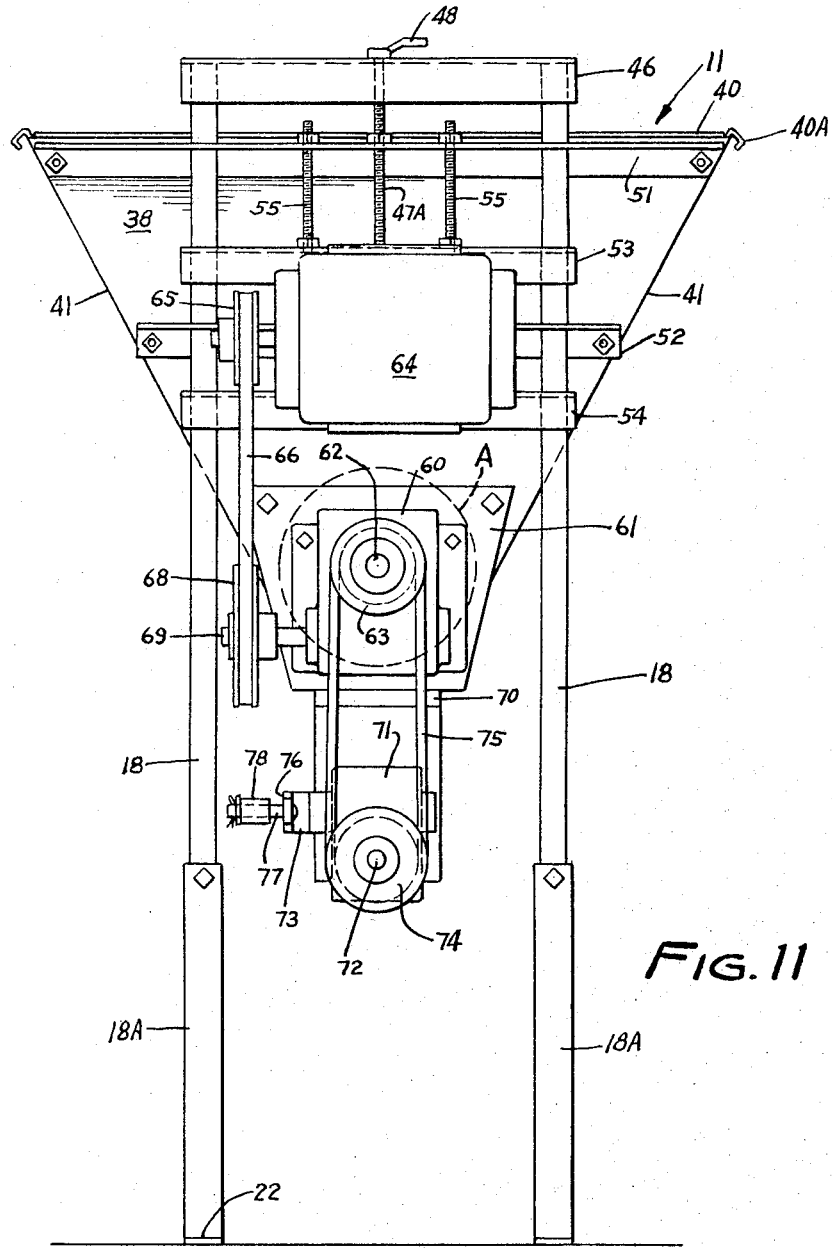
FIGURE 11 is an end view of the hopper assembly.
Figure 12:
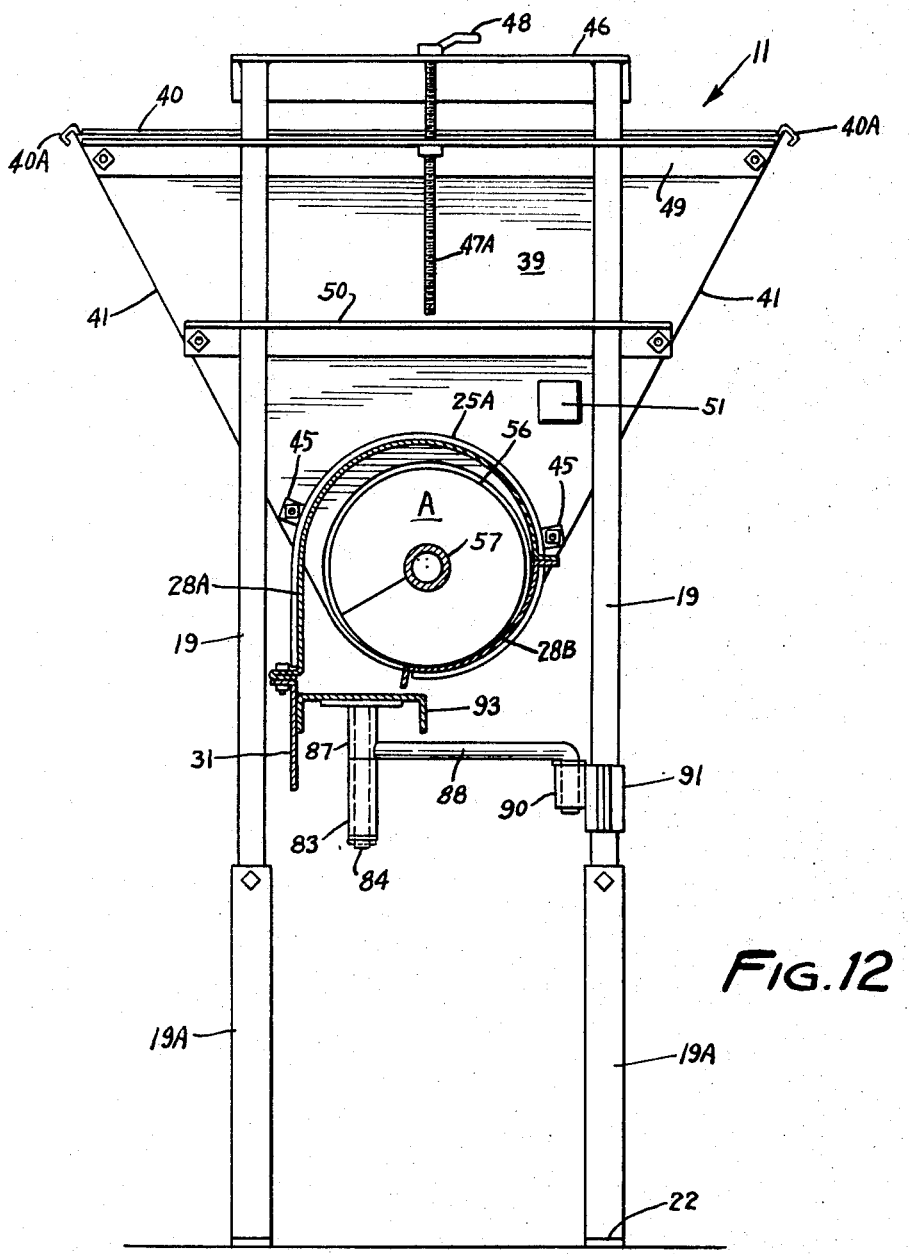
FIGURE 12 is an opposite end view thereof.

The wiring diagram, FIGURE 13, shows the interconnection of switches S1 and S2 (or S3). There motor 64 is shown connected to electric lines L1, L2 and L3 for operation. An appropriate disconnect or motor starter switch is used, not shown, and energizes the entire circuit. Lines L1 and L2 are connected to switches S1 and S2 (or S3) so that when either is closed solenoid 99 is actuated, as long as either is closed.

It will be apparent by reference to FIGURE 2 that the auger A is rotated in a direction to roll up the arcuate incline provided by the arcuate wear plates 28B, or clockwise with reference to FIGURE 3. Cover 28A and plate 28B provide in cross-section, a circle for the major portion of their combined peripheries. The circle is terminated at flange 30D and by a portion of cover 28A providing a straight edge portion joined to the curtain wall 31. The straight edge portion commences at a point substantially on a horizontal plane passed through the axis of auger A as seen by reference to FIGURE 2. The axis of auger A is offset downwardly and rightwardly with reference to the axis of the circular formed by portions 28A and 28B so that wear plate 28B cradles the auger as shown. The straight portion of cover 28A terminates in spaced relation to flange 30D to provide the opening 29.

Hence, there is a gradually increasing clearance between the circumference of auger A and the circle formed by members 28A and 28B, the clearance gradually increasing upwardly in a counter-clockwise direction as shown in FIGURE 2. The edge of wear plate 28B at flange 30D is positioned at slightly past a vertical plane passed through the axis of the circle to cradle the auger A when it is in the position shown. In other words, that edge of the wear plate (as at 30D) is positioned at one side also of a vertical plane passed through the axis of auger A when it is at rest position, but immediately adjacent that plane. The increasing clearance provided not only allows for give or freedom of the auger within the housing 28 when bunches of material or other obstructions are encountered, but also provides a space occupied by the material F for carrying of material over plates 93 as shown in FIGURE 2. Thus the space provides a trough of the cross-sectional configuration shown.

The bunk feeder of this invention may be operated in three fashions. In operation as a standard "carry over" type bunk feeder the sheave 63, belt 75, gear box 71, the connections to and closure members 93 are not utilized, nor is the tilt or divertor board assembly 14 used. In this fashion the motor 64 drives sheaves 65 which through belt 66 drives sheave 68 and shaft 69, which through gear box 60 drives the auger A in the direction shown in FIGURE 2, building up the material within the hood 28 as shown by the material F in that figure. The material, as can be visualized from FIGURE 1, is brought into the hopper 11, conveyed out of the hopper by the auger A into the sections of the feeder proper. As it is conveyed from the left end to the right end with reference to FIGURE 1, it commences to drop through the elongated aperture or slot 29 building up as a pile on the floor of the bunk B. As the auger continues to rotate the length of the pile continuously extends and the material is conveyed by carrying over upon itself, i.e., the pile of material itself acts as a closure for the portion of the bunk feeder over that portion of the bunk to which the material has already been delivered and the feed progresses from the left to the right with reference to FIGURE 1. In this instance the pressure switch assembly S2 (or S3) is not used, the feed is delivered to the end of the bunk and the motor is then de-activated. A saving is effected by omitting the un-used parts.

When it is desired to feed animals simultaneously and to achieve a number of the other objects of this invention, the pressure switch S2 (or S3) and plates 93 for closing slot 29 are used, providing an intermittent dumping of the feed material F. In this instance belt 75 through gear box 71 continuously actuates the crank 76 which continually reciprocates pitman arm 79 from the full to the dotted line position of FIGURE 5. However, arm 88 is not moved from the full to the dotted line position until member 97 engages member 96 (FIGURE 4) so the closure plates 93 are normally positioned as shown in FIGURE 2, to close the slot 29 and the material builds up as shown by F in FIGURE 2 by operation of the auger A and is carried over the plates 93 by the auger A. When the material F engages actuator 115 of pressure switch assembly S2, actuator 115 is moved from the full to the dotted line position of FIGURE 7, stretching the spring 122 from the full to the dotted line position and engaging the actuator of microswitch 120. The spring 121 as will be apparent, normally maintains the plate actuator 115 in the path of the flow of material F. Energization of microswitch 120 energizes solenoid 99 which causes the inclined face of member 97 to slip over the inclined face of member 96 as the solenoid 99 biases member 97 upwardly against tension of spring 100, and as arm 79 reciprocates.

Member 80 on its next reciprocation from the dotted to the full line position of FIGURE 5 moves member 82 with it by frictional engagement of members 96 and 97. Thus closure members 93 will be swung from the position of FIGURE 2, to the position of FIGURE 3, opening aperture or slot 29 and the material F will fall down to the bunk in one elongated mass or stream. Since the falling of the material will allow the tension of spring 121 to move actuator 115 from the dotted to the full line position of FIGURE 7 the solenoid 99 will be deactivated, spring 100 allowed to bias member 97 in the position of FIGURE 4 and pitman 79 will once more slip on rod 81.

The operation of the modified form of switch S3 shown in FIGURES 9 and 10 is substantially identical except that pressure is exerted on the membrane 128 which will then move actuator 129 to close the switch with the same results. When pressure is released on the membrane 128 by the material F dropping away as the slot 29 is opened the switch S3 is de-activated.

When desired, switch S1 may be activated to continuously engage solenoid 99 for the requisite number of dumps to clear the feeder of all material regardless of whether feed is actuating switch S2 (or S3) or not. Switch S1 is a manually operated "on-off" switch used to continuously provide solenoid 99 with electric power whereby gate 93 cyclically moves to open and closed positions.

If, in addition to the beneficial features provided by the dumping action of this invention, multiple lot feeding is desired the diverter boards 101 and divider boards 108 are installed. As will be apparent by FIGURE 2, by use of the handle 105 the boards 101 may be swung from the full to the dotted line position of FIGURE 2 and since they are positioned underneath slot 29 will divert material either leftwardly or rightwardly with reference to FIGURE 2, and animals may be fed at one side of the bunk or the other, as desirable.

It is apparent that many modifications and variations of this invention as hereinbefore set forth may be made without departing from the spirit and scope thereof. The specific embodiments described are given by way of example only and the invention is limited only by the terms of the appended claims.

I claim:
1. In a feeder, an elongated housing having a lower side feed discharge area, a cylindrical auger located in said housing, means rotating said auger for carrying feed to said feed discharge area, means for dumping feed stored in said feed discharge area, switch means operable to activate the means for dumping feed from the housing, said switch means having an actuator member, an actuator plate located in said discharge area, said actuator plate having a shape generally similar to the transverse cross-sectional shape of the discharge area and a curved portion positioned closely to said auger, hinge means mounting said plate on said feeder, said hinge means having a projection engageable with the actuator member of the switch means on outward movement of said actuator plate thereby activating the means for dumping feed from the housing.

2. The feeder defined in claim 1 including biasing means connected to said hinge means holding the actuator plate substantially perpendicular to the axis of rotation of the auger.

3. The feeder of claim 2 wherein said biasing means is a spring.

4. The feeder of claim 1 wherein the means for dumping feed stored in said feed discharge area includes a gate movable to a closed position for holding the feed in the feed discharge area and to an open position allowing feed to fall from the feed discharge area and power means for moving the gate to the open and closed positions.

5. The feeder defined in claim 1 wherein said housing has an open remote end, said switch means carried on a remote end section of the feeder, and said actuator plate having an area substantially less than the cross-sectional area of said open remote end of said housing.

6. The feeder defined in claim 1 wherein said switch means is mounted on the outside of the housing and said projection extended through an elongated aperture in the housing and positioned adjacent the actuator member of the switch means.

7. The feeder defined in claim 1 wherein said housing has an open remote end section and an elongated reservoir chamber for storing feed, said actuator plate being positioned within said reservoir chamber for intercepting feed delivered to the remote end section of the housing, said plate having a shape generally similar to the transverse cross-sectional shape of the reservoir chamber.

References Cited by the Examiner
UNITED STATES PATENTS

| 2,646,023 | 7/1953 | Virgil | 119—52 |
| 2,981,402 | 4/1961 | Cleveland | 198—213 |
| 2,987,040 | 6/1961 | Piel | 119—53 |
| 3,026,845 | 3/1962 | Winter | 119—51.11 |
| 3,123,049 | 3/1962 | Cordis | 119—52 |

SAMUEL KOREN, *Primary Examiner.*

ALDRICH F. MEDBERRY, *Examiner.*